US009367141B2

(12) United States Patent
Griffin et al.

(10) Patent No.: US 9,367,141 B2
(45) Date of Patent: Jun. 14, 2016

(54) HAND-HELD ELECTRONIC DEVICE WITH A KEYBOARD OPTIMIZED FOR USE WITH THE THUMBS

(71) Applicant: BlackBerry Limited, Waterloo (CA)

(72) Inventors: Jason T. Griffin, Waterloo (CA); John A. Holmes, Waterloo (CA); Mihal Lazaridis, Waterloo (CA); Herb A. Little, Waterloo (CA); Harry R. Major, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/791,311

(22) Filed: Mar. 8, 2013

(65) Prior Publication Data

US 2013/0201110 A1    Aug. 8, 2013

Related U.S. Application Data

(60) Continuation of application No. 12/628,597, filed on Dec. 1, 2009, now Pat. No. 8,416,195, which is a (Continued)

(51) Int. Cl.
*G06F 1/16*    (2006.01)
*G06F 3/02*    (2006.01)
(Continued)

(52) U.S. Cl.
CPC .............. *G06F 3/0216* (2013.01); *G06F 1/169* (2013.01); *G06F 1/1626* (2013.01); *G06F 1/1662* (2013.01); *G06F 1/1664* (2013.01);
(Continued)

(58) Field of Classification Search
CPC .......... G06F 1/1626; G06F 1/169; H04M 1/23
USPC .......................... 345/156–160, 162, 168–173; 341/20–21; D14/138, 191–192, D14/334–336; 400/472, 479, 486, 489; 455/575.1
See application file for complete search history.

(56) References Cited

U.S. PATENT DOCUMENTS 4,029,915 A    6/1977 Ojima
4,449,839 A    5/1984 Bleuer
(Continued)

FOREIGN PATENT DOCUMENTS

EP    0267801 A2    5/1988
EP    0278169 A2    8/1988
(Continued)

OTHER PUBLICATIONS

"Triangular Toggle Keys for Touch-Tone Phones"; IBM Technical Disclosure Bulletin, vol. 31, No. 1, Jun. 1, 1988, p. 47-49, NY, US.
(Continued)

*Primary Examiner* — Kumar Patel
*Assistant Examiner* — Mansour M Said
(74) *Attorney, Agent, or Firm* — Fish & Richardson P.C.

(57) ABSTRACT

A hand-held electronic device with a keyboard optimized for use with the thumbs is disclosed. In order to operate within the limited space available on a hand-held electronic device, the present invention optimizes the placement and shape of the keys, preferably using keys that are oval or oblong in shape, and that are placed at angles designed to facilitate thumb-typing. The angles at which keys on either side of the keyboard are placed is complimentary.

9 Claims, 4 Drawing Sheets

Related U.S. Application Data continuation of application No. 11/740,801, filed on Apr. 26, 2007, now Pat. No. 7,629,964, which is a continuation of application No. 10/425,121, filed on Apr. 28, 2003, now Pat. No. 7,227,536, which is a continuation of application No. 09/634,774, filed on Aug. 9, 2000, now Pat. No. 6,611,254, and a division of application No. 09/106,585, filed on Jun. 29, 1998, now Pat. No. 6,278,442, which is a continuation-in-part of application No. 29/089,942, filed on Jun. 26, 1998, now Pat. No. Des. 416,256.

(51) Int. Cl.
- *G06F 3/023* (2006.01)
- *G06F 3/0362* (2013.01)
- *G06F 3/038* (2013.01)
- *H04M 1/23* (2006.01)

(52) U.S. Cl.
CPC ............ *G06F1/1671* (2013.01); *G06F 3/0219* (2013.01); *G06F 3/0236* (2013.01); *G06F 3/0362* (2013.01); *G06F 3/0383* (2013.01); *H04M 1/23* (2013.01); *H01H 2225/022* (2013.01)

(56) References Cited

U.S. PATENT DOCUMENTS

| | | |
|---|---|---|
| D278,341 S | 4/1985 | Scheid |
| 4,625,557 A | 12/1986 | Rutherford |
| D293,241 S | 12/1987 | Wan et al. |
| RE32,686 E | 5/1988 | Dages |
| 4,804,279 A | 2/1989 | Berkelmans et al. |
| 4,953,120 A * | 8/1990 | Nishiyama ................... 345/168 |
| D312,628 S | 12/1990 | Yokoi et al. |
| D313,401 S | 1/1991 | Tanabe |
| D313,413 S | 1/1991 | Langton |
| 5,044,291 A * | 9/1991 | Kobayashi et al. ........... 112/445 |
| 5,059,048 A | 10/1991 | Sirkin |
| 5,184,830 A | 2/1993 | Okada et al. |
| 5,217,295 A | 6/1993 | Tortola et al. |
| 5,288,158 A | 2/1994 | Matias |
| D345,158 S | 3/1994 | Namba et al. |
| 5,331,337 A * | 7/1994 | Kabeya et al. ................ 345/172 |
| 5,336,001 A | 8/1994 | Lichtenberg |
| 5,337,346 A | 8/1994 | Uchikura |
| 5,360,280 A | 11/1994 | Camacho et al. |
| 5,367,298 A | 11/1994 | Axhelm |
| D357,253 S | 4/1995 | Wong |
| 5,410,141 A | 4/1995 | Koench et al. |
| 5,410,333 A | 4/1995 | Conway |
| 5,416,730 A | 5/1995 | Lookofsky |
| 5,426,449 A | 6/1995 | Danziger |
| D359,920 S | 7/1995 | Sakamoto |
| 5,436,954 A | 7/1995 | Nishiyama et al. |
| 5,436,960 A | 7/1995 | Campana, Jr. et al. |
| 5,444,763 A | 8/1995 | Lazaridis et al. |
| 5,457,454 A | 10/1995 | Sugano |
| D367,043 S | 2/1996 | Ross et al. |
| 5,500,643 A | 3/1996 | Grant |
| 5,543,787 A | 8/1996 | Karidis et al. |
| 5,555,241 A | 9/1996 | Lazaridis et al. |
| 5,559,800 A | 9/1996 | Mousseau et al. |
| 5,563,631 A | 10/1996 | Masunaga |
| 5,575,576 A | 11/1996 | Roysden, Jr. |
| 5,600,790 A | 2/1997 | Barnstijn et al. |
| 5,606,712 A | 2/1997 | Hikada |
| 5,611,031 A | 3/1997 | Hertzfeld et al. |
| 5,619,531 A | 4/1997 | Taylor et al. |
| D381,021 S | 7/1997 | Williams et al. |
| 5,657,345 A | 8/1997 | Lazaridis |
| 5,659,307 A | 8/1997 | Karidis et al. |
| 5,661,605 A | 8/1997 | Conway |
| D383,756 S | 9/1997 | Henderson et al. |
| 5,666,138 A | 9/1997 | Culver |
| 5,672,108 A | 9/1997 | Lam et al. |
| D386,497 S | 11/1997 | Huslig et al. |
| 5,689,253 A | 11/1997 | Hargreaves et al. |
| D390,509 S | 2/1998 | Antzinas et al. |
| 5,715,387 A | 2/1998 | Barnstijn et al. |
| 5,727,020 A | 3/1998 | Taylor et al. |
| 5,732,346 A | 3/1998 | Lazaridis et al. |
| 5,737,394 A | 4/1998 | Anderson et al. |
| 5,754,737 A | 5/1998 | Gipson |
| 5,786,776 A | 7/1998 | Kisaichi et al. |
| D397,369 S | 8/1998 | Rissman |
| 5,797,089 A | 8/1998 | Nguyen |
| D397,728 S | 9/1998 | Yuen et al. |
| 5,802,312 A | 9/1998 | Lazaridis et al. |
| D399,537 S | 10/1998 | Chi et al. |
| 5,818,437 A | 10/1998 | Grover et al. |
| 5,821,907 A | 10/1998 | Zhu et al. |
| 5,825,353 A | 10/1998 | Will |
| 5,827,082 A | 10/1998 | Laine |
| D402,572 S | 12/1998 | Han |
| D403,362 S | 12/1998 | Fai |
| 5,857,212 A | 1/1999 | Van De Vanter |
| 5,861,821 A | 1/1999 | Kato et al. |
| 5,861,823 A | 1/1999 | Strauch et al. |
| 5,862,183 A | 1/1999 | Lazaridis et al. |
| 5,893,798 A | 4/1999 | Stambolic et al. |
| 5,912,661 A | 6/1999 | Siddiqui |
| 5,915,228 A * | 6/1999 | Kunihiro et al. ........... 455/575.1 |
| 5,917,854 A | 6/1999 | Taylor et al. |
| 5,920,308 A | 7/1999 | Kim |
| 5,930,703 A | 7/1999 | Cairns |
| 5,931,873 A | 8/1999 | Cisar |
| 5,949,408 A | 9/1999 | Kang et al. |
| 5,963,197 A | 10/1999 | Bacon et al. |
| 5,966,098 A | 10/1999 | Qi et al. |
| 5,970,090 A | 10/1999 | Lazaridis |
| 5,974,238 A | 10/1999 | Chase, Jr. |
| 5,974,413 A | 10/1999 | Beauregard et al. |
| D416,024 S | 11/1999 | Johansson et al. |
| D416,256 S | 11/1999 | Griffin et al. |
| D417,219 S | 11/1999 | Barrette et al. |
| 5,982,520 A | 11/1999 | Weiser et al. |
| 5,982,613 A | 11/1999 | Sternglass et al. |
| 5,995,026 A | 11/1999 | Sellers et al. |
| 6,005,496 A | 12/1999 | Hargreaves et al. |
| 6,006,351 A | 12/1999 | Peretz et al. |
| 6,008,799 A | 12/1999 | Van Kleeck |
| 6,009,333 A | 12/1999 | Chaco |
| 6,014,429 A | 1/2000 | LaPorta et al. |
| 6,014,573 A | 1/2000 | Lehtonen et al. |
| 6,018,651 A | 1/2000 | Bruckert et al. |
| 6,018,770 A | 1/2000 | Little et al. |
| D420,351 S | 2/2000 | Waldner |
| 6,023,779 A | 2/2000 | Fullam et al. |
| 6,025,931 A | 2/2000 | Bloomfield |
| 6,031,505 A | 2/2000 | Qi et al. |
| 6,034,623 A | 3/2000 | Wandel et al. |
| 6,046,730 A | 4/2000 | Bowen et al. |
| 6,046,732 A | 4/2000 | Nishimoto |
| 6,047,047 A | 4/2000 | Aldridge et al. |
| 6,047,196 A | 4/2000 | Makela et al. |
| 6,047,197 A | 4/2000 | Jerrad |
| 6,049,796 A | 4/2000 | Siitonen et al. |
| 6,052,070 A | 4/2000 | Kivela et al. |
| 6,061,557 A | 5/2000 | Lazaridis et al. |
| 6,073,318 A | 6/2000 | Phillips |
| 6,075,470 A | 6/2000 | Little et al. |
| 6,084,576 A | 7/2000 | Leu et al. |
| 6,091,956 A | 7/2000 | Hollenberg et al. |
| 6,094,197 A | 7/2000 | Buxton et al. |
| 6,097,964 A | 8/2000 | Nuovo et al. |
| 6,102,594 A | 8/2000 | Strom |
| 6,103,979 A | 8/2000 | Motoyama et al. |
| 6,104,759 A | 8/2000 | Carkner et al. |
| 6,105,871 A | 8/2000 | Campo et al. |
| 6,107,988 A | 8/2000 | Phillips et al. |
| 6,107,997 A | 8/2000 | Ure et al. |

(56) References Cited

U.S. PATENT DOCUMENTS

| | | | |
|---|---|---|---|
| D432,511 S | 10/2000 | Eckholm | |
| D433,017 S | 10/2000 | Martinez | |
| D433,460 S | 11/2000 | Griffin et al. | |
| 6,148,261 A | 11/2000 | Obradovich et al. | |
| 6,157,323 A | 12/2000 | Tso et al. | |
| 6,160,383 A | 12/2000 | Carkner et al. | |
| D436,591 S | 1/2001 | Abston et al. | |
| 6,180,876 B1 | 1/2001 | Holmes | |
| 6,191,551 B1 | 2/2001 | Fischer et al. | |
| 6,198,474 B1 | 3/2001 | Roylance | |
| 6,212,412 B1 * | 4/2001 | Rogers et al. | 455/575.1 |
| 6,219,694 B1 | 4/2001 | Lazaridis et al. | |
| D441,733 S | 5/2001 | Do et al. | |
| 6,243,789 B1 | 6/2001 | Hasbun et al. | |
| D445,428 S | 7/2001 | Pattenden | |
| 6,255,915 B1 | 7/2001 | Edmonson | |
| 6,256,011 B1 | 7/2001 | Culver | |
| 6,262,609 B1 | 7/2001 | Hafez et al. | |
| 6,271,605 B1 | 8/2001 | Carkner et al. | |
| 6,278,442 B1 | 8/2001 | Griffin et al. | |
| 6,295,052 B1 | 9/2001 | Kato et al. | |
| 6,297,795 B1 | 10/2001 | Kato et al. | |
| 6,304,261 B1 | 10/2001 | Shields et al. | |
| 6,304,431 B1 | 10/2001 | Kim | |
| 6,310,609 B1 | 10/2001 | Morgenthaler | |
| D451,079 S | 11/2001 | Ali | |
| 6,329,951 B1 | 12/2001 | Wen et al. | |
| D454,349 S | 3/2002 | Makidera et al. | |
| D454,849 S | 3/2002 | Eckholm | |
| 6,356,258 B1 | 3/2002 | Kato et al. | |
| 6,359,572 B1 | 3/2002 | Vale | |
| 6,374,277 B2 | 4/2002 | Vong et al. | |
| 6,380,711 B2 | 4/2002 | Fischer et al. | |
| D456,794 S | 5/2002 | Laverick et al. | |
| D457,308 S | 5/2002 | Infanti | |
| 6,385,306 B1 | 5/2002 | Baxter, Jr. | |
| 6,385,463 B1 | 5/2002 | Lieberman et al. | |
| 6,389,457 B2 | 5/2002 | Lazaridis et al. | |
| 6,396,482 B1 | 5/2002 | Griffin et al. | |
| D458,239 S | 6/2002 | Shim et al. | |
| D459,327 S | 6/2002 | Ali | |
| 6,401,113 B2 | 6/2002 | Lazaridis et al. | |
| 6,405,910 B1 | 6/2002 | Infanti et al. | |
| D460,068 S | 7/2002 | Lanzaro et al. | |
| D460,493 S | 7/2002 | Griffin et al. | |
| 6,426,614 B1 | 7/2002 | Guthrie | |
| D461,803 S | 8/2002 | Griffin et al. | |
| 6,438,585 B2 | 8/2002 | Mousseau et al. | |
| 6,452,588 B2 | 9/2002 | Griffin et al. | |
| D464,995 S | 10/2002 | Griffin et al. | |
| 6,459,968 B1 | 10/2002 | Kochie | |
| 6,462,698 B2 | 10/2002 | Campbell et al. | |
| 6,463,112 B1 | 10/2002 | Hafez et al. | |
| 6,463,463 B1 | 10/2002 | Godfrey et al. | |
| 6,463,464 B1 | 10/2002 | Lazaridis et al. | |
| 6,473,733 B1 | 10/2002 | McArthur et al. | |
| 6,477,529 B1 | 11/2002 | Mousseau et al. | |
| 6,480,186 B1 | 11/2002 | McCabe et al. | |
| 6,483,388 B2 | 11/2002 | Khan | |
| D467,917 S | 12/2002 | Tischer | |
| 6,489,950 B1 | 12/2002 | Griffin et al. | |
| 6,490,589 B1 | 12/2002 | Weider et al. | |
| 6,507,336 B1 | 1/2003 | Lunsford | |
| 6,525,676 B2 | 2/2003 | Kisaichi et al. | |
| D472,225 S | 3/2003 | Griffin | |
| 6,535,749 B1 | 3/2003 | Iwata et al. | |
| 6,535,949 B1 | 3/2003 | Parker | |
| 6,538,651 B1 | 3/2003 | Haymann et al. | |
| D472,551 S | 4/2003 | Griffin | |
| D473,226 S | 4/2003 | Griffin et al. | |
| 6,570,462 B2 | 5/2003 | Edmonson et al. | |
| 6,578,154 B1 | 6/2003 | Wynen et al. | |
| 6,580,163 B2 | 6/2003 | Poulin | |
| 6,583,601 B2 | 6/2003 | Simoes et al. | |
| D476,985 S | 7/2003 | Griffin | |
| 6,586,993 B2 | 7/2003 | Macedo | |
| D478,585 S | 8/2003 | Griffin | |
| 6,608,616 B2 | 8/2003 | Lin et al. | |
| 6,611,254 B1 | 8/2003 | Griffin et al. | |
| 6,611,255 B2 | 8/2003 | Griffin et al. | |
| D479,233 S | 9/2003 | Griffin | |
| D479,714 S | 9/2003 | Donner | |
| 6,614,866 B2 | 9/2003 | Hafez et al. | |
| 6,618,697 B1 | 9/2003 | Kantrowitz et al. | |
| D480,722 S | 10/2003 | Griffin et al. | |
| 6,630,924 B1 | 10/2003 | Peck et al. | |
| D482,353 S | 11/2003 | Helin | |
| 6,647,367 B2 | 11/2003 | McArthur et al. | |
| 6,731,227 B2 | 5/2004 | Horie | |
| 6,744,890 B1 | 6/2004 | Le et al. | |
| 6,842,169 B2 | 1/2005 | Griffin et al. | |
| 6,867,763 B2 | 3/2005 | Griffin et al. | |
| 6,873,317 B1 | 3/2005 | Griffin et al. | |
| 6,919,879 B2 | 7/2005 | Griffin et al. | |
| 6,973,052 B2 | 12/2005 | Wang et al. | |
| 7,158,120 B2 | 1/2007 | Griffin et al. | |
| 7,227,536 B2 | 6/2007 | Griffin et al. | |
| 7,319,461 B2 | 1/2008 | Griffin et al. | |
| 7,395,089 B1 | 7/2008 | Hawkins et al. | |
| 7,495,660 B2 | 2/2009 | Griffin et al. | |
| 7,629,964 B2 | 12/2009 | Griffin et al. | |
| 7,639,241 B2 | 12/2009 | Griffin et al. | |
| 7,705,828 B2 | 4/2010 | Griffin et al. | |
| 7,952,571 B2 | 5/2011 | Griffin et al. | |
| 7,969,419 B2 | 6/2011 | Griffin et al. | |
| 8,144,135 B2 | 3/2012 | Griffin et al. | |
| 8,416,195 B2 | 4/2013 | Griffin et al. | |
| 8,464,149 B2 | 6/2013 | Griffin et al. | |
| 8,493,322 B2 | 7/2013 | Griffin et al. | |
| 2001/0044828 A1 | 11/2001 | Kikinis | |
| 2001/0048589 A1 | 12/2001 | Brandenberg | |
| 2002/0054676 A1 | 5/2002 | Zhao et al. | |
| 2002/0072395 A1 | 6/2002 | Miramontes | |
| 2002/0146989 A1 * | 10/2002 | Moriki | 455/90 |
| 2002/0158844 A1 | 10/2002 | McLoone et al. | |
| 2003/0006968 A1 | 1/2003 | Solomon | |
| 2003/0025673 A1 | 2/2003 | Ledbetter et al. | |

FOREIGN PATENT DOCUMENTS

| | | | |
|---|---|---|---|
| EP | 0538020 A1 | 4/1993 | |
| EP | 0685801 A1 | 12/1995 | |
| EP | 0732646 A2 | 9/1996 | |
| EP | 0760291 | 3/1997 | |
| EP | 1143327 A1 | 10/2001 | |
| JP | 64-35429 | 8/1987 | |
| JP | H04-102911 | 4/1992 | |
| WO | 96/04618 | 2/1996 | |
| WO | 9833111 A1 | 7/1998 | |
| WO | 9937025 A1 | 7/1999 | |
| WO | 00/30381 A1 | 5/2000 | |
| WO | 0038041 A1 | 6/2000 | |
| WO | 00/74240 A1 | 12/2000 | |
| WO | 0150335 A1 | 7/2001 | |

OTHER PUBLICATIONS

"Programmable Calculators: Hewlett-Packard HP-200LX," Viktor T. Toth, copyr. 2001, 2002, from web page at www.rskey.org/hp200lx.html.

Office Action for U.S. Appl. No. 11/561,540 dated Jan. 27, 2011 (6 pages).

Portion (pp. 1-7) of "Motorola Inc.'s First Supplement Response to First set of Interrogatories (No. 14)" and Exhibit A appended to the Response; Jul. 15, 2009 (27 pages).

Photo of Motorola Page Writer 2000 Product, noted in Table 1 of p. 7 of of Cite No. 1; photo dale unknown, product said by Motorola to be available in early 1997 (1 page).

Photo of Motorola Page Writer 250 Product, noted in Table 1 of p. 7 of Cite No. 1; photo dale unknown, product said by Motorola to be available in early 1997 (1 page).

(56) References Cited

OTHER PUBLICATIONS

Photo of RIM Inter@ctive Pager 800/900, noted in Table 1 of p. 7 of Cite No. 1; photo date unknown, product said by Motorola to be available in 1996 (1 page).
Photo of Nokia 9000 Communication Product, noted in Table 1 of p. 7 of Cite No. 1; photo dale unknown' product said by Motorola to be available in 1996 (1 page).
Photo of RIM 850/950 Product, product announcement, noted in Table 1 of p. 7 of Cite No. 1; photo dale unknown, product (RIM 950) said by Motorola to be available on Sep. 1, 1998 (1 page).
Research in Motion Lld./RAM Mobile Data Supply Agreement pertaining to RIM 850-950 Product; Jun. 27, 1997 (23 pages).
Photo of Philips Velo 1 Product, noted in Table 1 of p. 7 of Cite No. 1; photo date unknown, product said by Motorola to be available in Aug. 1997 (1 page).
Photo of NEC Talklime 800 Series Product and product literature, noted in Table 1 of p. 7 of Cite No. 1; photo date unknown, user guide said by Motorola to be available in 1996, 1997 (37 pages).
Photo of AEG 1995 Product, noted in Table 1 of p. 7 of Cite No. 1; photo date unknown, product said by Motorola to be available in 1995. (1 page).
Photo of Motorola 1997 Product, noted in Table 1 of p. 7 of Cite No. 1; photo date unknown, product said by Motorola to be available in 1997 (1 page).
Photo of Husky Field Explorer 21 Product, noted in Table 1 of p. 7 of Cite No. 1; photo date unknown, product said by Motorola to be available in Mar./Apr. 1999 (1 page).
Photo of Motorola t900 Product, noted in Table 1 of p. 7 of Cite No. 1; photo date unknown, product said by Motorola to be available on Jan. 6, 2000 (1 page).
Photo of RIM 857 Product, noted in Table 1 of p. 7 of Cite No. 1; photo date unknown, product said by Motorola to have been released in Oct. 2000 (1 page).
Photo of Ether Age ClipLee MiniKeyboard Product, noted in Table 1 of p. 7 of Cite No. 1; photo date unknown, advertising related to the product said by Motorola to be available Jul. 2001 (1 page).
Photo of Handspring Treo 180 Product, noted in Table 1 of p. 7 of Cite No. 1; photo of date unknown, product said by Motorola to be available in 1997 (1 page).
Sandberg-Diment, Erik; "Personal Computers; Artificial Intelligence: New Software Arrives"; Sep. 17, 1985; The New York Times; pp. 1-4.
Mastering Microsoft Office 97, Moseley et al. 1996, pp. 314-316.
Office Action in Canadian Application No. 2,547,927 mailed by the Canadian Patent Office on Dec. 3, 2012 (3 pages).
Canadian Office Action dated Jun. 23, 2011, which issued in Canadian Application No. 2,547,927 (3 pages).
Non-Final Office Action mailed Aug. 15, 2001 in U.S. Appl. No. 09/344,432.
Final Office Action mailed Dec. 5, 2001 in U.S. Appl. No. 09/344,432.
Non-Final Office Action mailed Feb. 17, 2012 in U.S. Appl. No. 13/244,790.
Final Office Action mailed Jul. 5, 2012 in U.S. Appl. No. 13/244,790.
United States Office Action in U.S. Appl. No. 13/111,596, dated Feb. 23, 2015, 16 pages.
United States Office Action in U.S. Appl. No. 13/926,014, dated Feb. 23, 2015, 9 pages.
Office Action issued in Canadian Application No. 2,547,927 on Dec. 9, 2014; 4 pages.
Office Action issued in Canadian Application No. 2,517,815 on Apr. 14, 2009 (2 pages).
Office Action in Canadian Application No. 2,547,927 mailed by the Canadian Patent Office on Mar. 26, 2010 (3 pages).
Office Action in Canadian Application No. 2,276,698 mailed by the Canadian Patent Office on Mar. 26, 2002 (3 pages).
Office Action in Canadian Application No. 2,389,985 mailed on May 14, 2008 (3 pages).
Office Action in Canadian Application No. 2,389,985 mailed on Jul. 8, 2011 (3 pages).
Office Action in Canadian Application No. 2,395,021 mailed on Dec. 22, 2004 (4 pages).
Office Action in Canadian Application No. 2,276,697 mailed on Mar. 26, 2002 (3 pages).
Office Action in Canadian Application No. 2,357,562 mailed on Apr. 14, 2003 (3 pages).
European Search Report dated Jul. 23, 2001 for European Application No. 01108508.1 (3 pages).
Office Action dated Apr. 2, 2003 for European Application No. 01108508.1 (5 pages).
Office Action issued by Canadian Intellectual Property Office in Canadian Patent Application No. 2,547,927, dated Feb. 13, 2014 (4 pages).

\* cited by examiner

HAND-HELD ELECTRONIC DEVICE WITH A KEYBOARD OPTIMIZED FOR USE WITH THE THUMBS

CROSS-REFERENCE TO RELATED APPLICATION

This application is a continuation of U.S. application Ser. No. 12/628,597, entitled Hand-Held Electronic Device With A Keyboard Optimized For Use With The Thumbs, filed Dec. 1, 2009, which is a continuation of U.S. application Ser. No. 11/740,801, entitled, Hand-Held Electronic Device With A Keyboard Optimized For Use With The Thumbs, filed Apr. 26, 2007 (now U.S. Pat. No. 7,629,964), which is a continuation application of U.S. application Ser. No. 10/425,121, entitled Hand-Held Electronic Device With A Keyboard Optimized For Use With The Thumbs, filed Apr. 28, 2003 (now U.S. Pat. No. 7,227,536), which is a continuation of U.S. application Ser. No. 09/634,774, entitled Hand-Held Electronic Device With A Keyboard Optimized For Use With The Thumbs, filed Aug. 9, 2000 (now U.S. Pat. No. 6,611,254), which is a divisional of U.S. application Ser. No. 09/106,585, entitled Hand-Held Electronic Device With A Keyboard Optimized For Use With The Thumbs, filed Jun. 29, 1998 (now U.S. Pat. No. 6,278,442), which is a Continuation-In-Part of U.S. Design Application Serial No. 29/089,942, entitled Hand-Held Messaging Device With Keyboard, filed Jun. 26, 1998 (now U.S. Pat. No. Des. 416,256), and assigned to the assignee of the present invention.

BACKGROUND OF THE INVENTION

The present invention is directed toward the field of small, hand-held electronic devices such as personal data assistants (PDAs), personal information managers (PIMs), two-way pagers and the like. In particular, the system and method of the present invention provide the user of the hand-held device with the ability to input data with a minimal amount of key strokes and optimized for use substantially with the thumbs.

In a two-way paging system that provides two-way, full text messaging, there is a need to permit the user to initiate messages and to respond to messages in a timely fashion and with text entirely created by the user. In order to keep the form factor of the two-way pager small enough to be worn on the body of the user, such as with a belt clip, the input device needs to be small, have a minimal number of keys and optimized for use with a minimal number of key strokes. Prior art systems have attempted to address these needs by incorporating virtual keyboards or pen-based input systems for user inputs to the device, but such systems require the user to input data in an unfamiliar manner. Additionally, in a small handheld messaging device, such as a two-way pager, these systems prove awkward to use.

In order to provide a hand-held electronic device that permits a user the opportunity to enter data into an address book, a calendar, a task list, an email message or a similar text file that requires user-generated data, the instant invention is directed to an input device that is oriented to be used substantially through use of the thumbs. This is accomplished first by providing a keyboard with a minimal number of keys, but with the keys representing the alphabet generally placed in the same order as they would appear on a standard keyboard, such as in a standard QWERTY or a DVORAK keyboard layout. The use of a keyboard layout that is familiar to the user enables the user to immediately use the device without having to hunt for the keys he or she wishes to use.

Although the layout is similar to a standard keyboard, the keys are placed at an orientation and in a particular shape that attempts to maximize the surface area of the thumb hitting the key and to provide the user with a comfortable position of the hands for data input. Also, the orientation encourages input by the thumbs, which the inventors of the instant invention have discovered to be faster and more accurate in small hand-held electronic devices than touch-typing or "hunting and pecking" typing.

An additional feature of the invention is thus use of an additional input means for control of functions that might otherwise be controlled by a keyboard that included function keys. To encourage data entry using thumbs and again to minimize the number of keys on the keyboard, the instant invention also includes a thumb-wheel for control of menus for selection of forms and functions relevant to data input. The thumb-wheel is positioned in close proximity to the keyboard to enable the easy transition from thumb-based typing to thumb control of forms and functions.

In addition to hardware features that encourage optimal data entry through the use of thumbs, there are several software features that are designed to minimize keystrokes and aid in entry of data.

The features of this invention, both individually and collectively, have not, to the knowledge of the inventors, been applied to a small hand-held electronic device that requires user-generated data entry. To permit efficient operation of such devices while keeping the form factor of the device small enough to be worn on the body, there is a general need for a hand-held electronic device that can fit in the palm of the hand and that can be operated substantially with the thumbs.

There is a further need for a keyboard for a palm-size data entry device with keys placed at an angle to optimize operation of the keyboard by the use of the thumbs.

There remains another need for a keyboard with keys that are shaped and sized to maximize contact with the thumbs while minimizing the keyboard area required for such keys.

There also remains a need for an auxiliary input device that is to be operated by the thumb for data inputs forms and function control and that, in conjunction with the keyboard, encourages and permits data entry and management through input performed substantially by the thumbs.

There remains still another need for a software-implemented user interface system that is designed, at least in part, to support and encourage data entry through use of the thumbs.

SUMMARY OF THE INVENTION

The present invention overcomes the problems noted above and satisfies the needs in this field for a hand-held electronic device with a keyboard optimized for use with the thumbs. In the preferred embodiment of the present invention, the hand-held electronic device is a two-way paging device that permits full-text, two-way messaging such as email messaging and that includes standard PDA or PIM features such as an address book, an electronic calendar, a task list and other text-based features. These features require user input of text strings that can be lengthy and that cannot be reduced to pre-determined or "canned" strings. Thus, for such a device, the efficient entry of data in a device meant to fit into the palm of one's hand requires that two goals are achieved. First, the data entry must be relatively easy from a user perspective. This means that the user must be somewhat familiar with analogous forms of data entry and not have to be trained to use the data entry for the hand-held device. Second, the form factor does not permit a large number of keys or keys that are very large. Thus efficient use of the keyboard space is required and functions that might be able to be performed by a standard key board are off-loaded to an auxiliary input device or are performed, through a minimal number of keystrokes that encourage the use of thumb-based data entry.

To accomplish these goals, the invention first optimizes the placement of the keys on the device keyboard. In order to work within the limited space available for the keyboard, it was determined that it was preferable to use keys that were oval or oblong and that were placed at angles designed to facilitate use by thumb typing. An angle for the keys on the right side of the keyboard and a complementary angle for the keys on the left side of the keyboard are chosen based upon observation of the angle at which a user will orient his or her thumbs while thumb-typing.

The invention also minimizes the number of keys available for data input. In the preferred embodiment, only keys for the 26 letters of the English alphabet are available as well as a backspace key, a line feed key, an "alt" key, a "cap" key and a space bar. The alt key enables the user in conjunction with the other keys to input numbers and symbols to perform certain functions. The placement of the keys is designed to enhance the user experience while typing with the thumbs by meeting two seemingly opposite goals—minimizing the keyboard footprint while maximizing the likelihood that proper keys will be struck by the thumb-typing user.

The invention also provides additional incentive for the user to use thumb input by providing an input device adjacent to the keyboard, but integral to the overall hand-held device. Although other devices can be used in an auxiliary fashion, the preferred device is a thumbwheel that registers movement of the wheel by measuring the number of indents traversed while rolling the wheel and that also registers as an input the depression or "clicking" of the wheel, which is performed by pressing the wheel toward the back of the pager. This clicking of the wheel is similar to the clicking of a mouse associated with a PC or any other input device that registers the depression of a button. The thumbwheel the preferred embodiment is placed vertically on the two-way paging device so that the user can easily move his or her thumb from the thumbwheel to the keyboard and back for performing functions and retrieving data forms, such as an e-mail template or address book entry template, for data entry.

Additionally, various software techniques can be implemented to enhance the thumb-typing user's experience in using the device of the instant invention. In the preferred embodiment, for example, the user can change the capitalization of a particular letter simply by keeping a key depressed for a particular length of time without an intermittent release being detected by the keyboard controller.

The primary advantage of the present invention is that it enables efficient and user-friendly data entry into a palm-sized electronic device by maximizing the potential for user data entry through thumb typing.

These are just a few of the many advantages of the present invention, as described in more detail below. As will be appreciated, the invention is capable of other and different embodiments and its several details are capable of modifications in various respects, all without departing from the spirit of the invention. Accordingly, the drawings and description of the preferred embodiment set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE INVENTION

Figure 1:
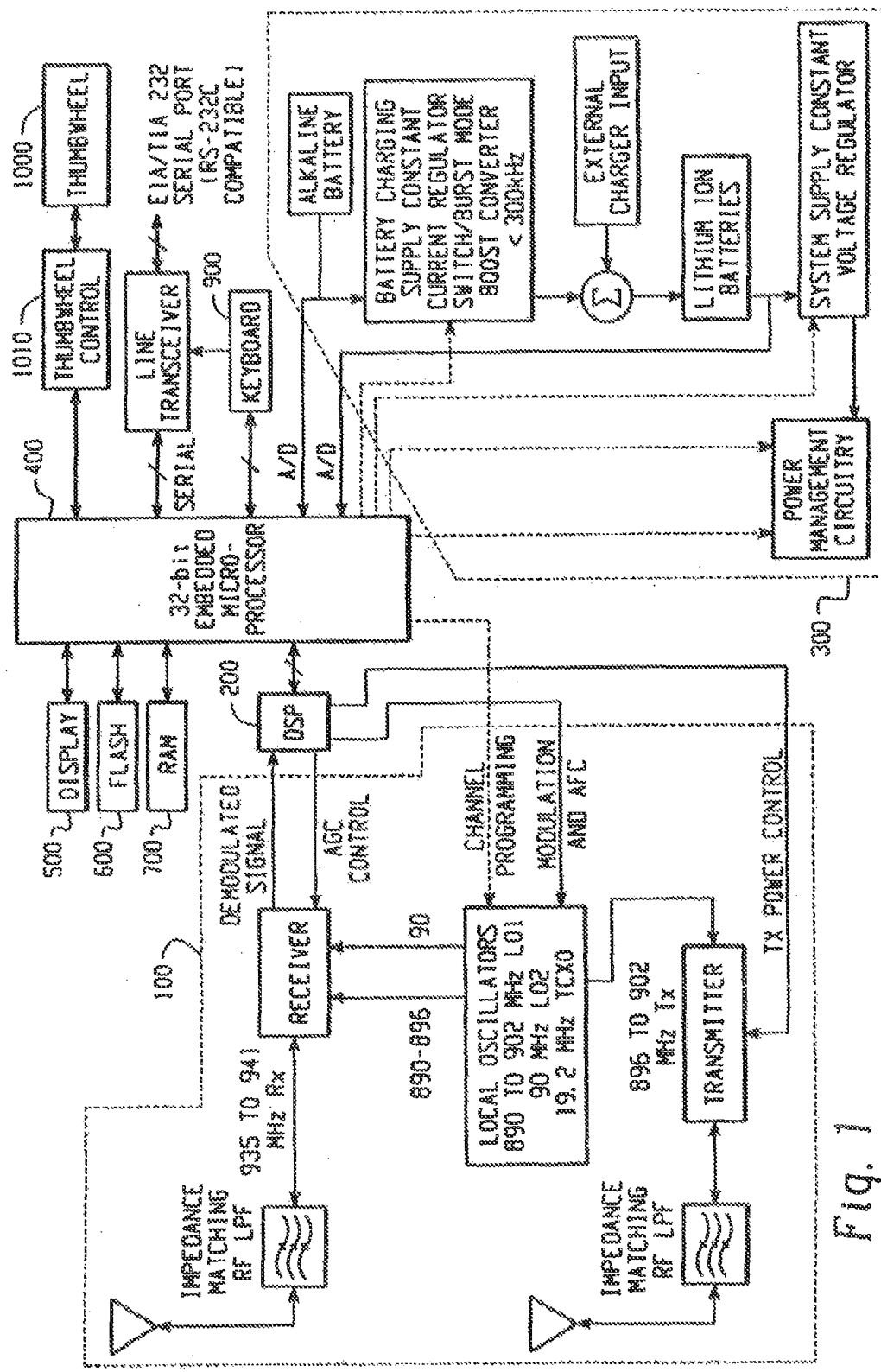
FIG. 1 is a block diagram of a two-way, full-text, messaging device incorporating a keyboard and an auxiliary data entry device.

Referring now to the drawings, FIG. 1 is a block diagram of the major subsystems and elements comprising a palm-sized, mobile, two-way messaging device that preferably incorporates the invention. In its broadest terms, the messaging device includes a transmitter/receiver subsystem 100 connected to a DSP 200 for digital signal processing of the incoming and outgoing data transmissions, power supply and management subsystem 300, which supplies and manages power to the overall messaging device components, microprocessor 400, which is preferably an X86 architecture processor, that controls the operation of the messaging device, display 500, which is preferably a full graphic LCD, FLASH memory 600, RAM 700, serial output and port 800, keyboard 900, thumbwheel 1000 and thumbwheel control logic 1010. In its intended use, a message comes via a wireless data network, such as the Mobitex network, into subsystem 100, where it is demodulated via DSP 200 and decoded and presented to microprocessor 300 for display on display 500. To access the display of the message, the user may choose from functions listed under a menu presented as a result of user interaction with thumbwheel 1000. If the message is an email message, the user may choose to respond to the email by selecting "Reply" from a menu presented on the display through interaction via thumbwheel 1000 or via menu selection from keyboard 900. In typing the reply, the user can use keyboard 900 to type full text message replies, or insert a pre-determined or "canned" response by either a particular keystroke pattern or through pulling down pre-determined text strings from a menu of items presented on display 500 through the use of thumbwheel 1000. When the reply to the message is composed, the user can initiate the sending of the message preferably by interaction through thumbwheel 1000, or alternatively, with less efficiency, through a combination of keyboard 900 keystrokes. When the microprocessor 300 receives an indication that the message is to be sent, it processes the message for transport and, by directing and communicating with transmitter/receiver subsystem 100, enables the reply message to be sent via the wireless communications data network to the intended recipient. Similar interaction through I/O devices keyboard 900 and thumbwheel 1000 can be used to initiate full-text messages or to forward messages to another party. Also, the keyboard 900 and thumbwheel 1000 can be used to permit data entry to an address book resident on the messaging device, or an electronic calendar or log book, or any other function on the messaging device requiring data entry. Preferably, the thumbwheel is a thumbwheel with a push button SPST with quadrature signal outputs, such as that manufactured by Matsushita Electronic Components Co. Ltd. As part number EVQWK2001.

Figure 2:
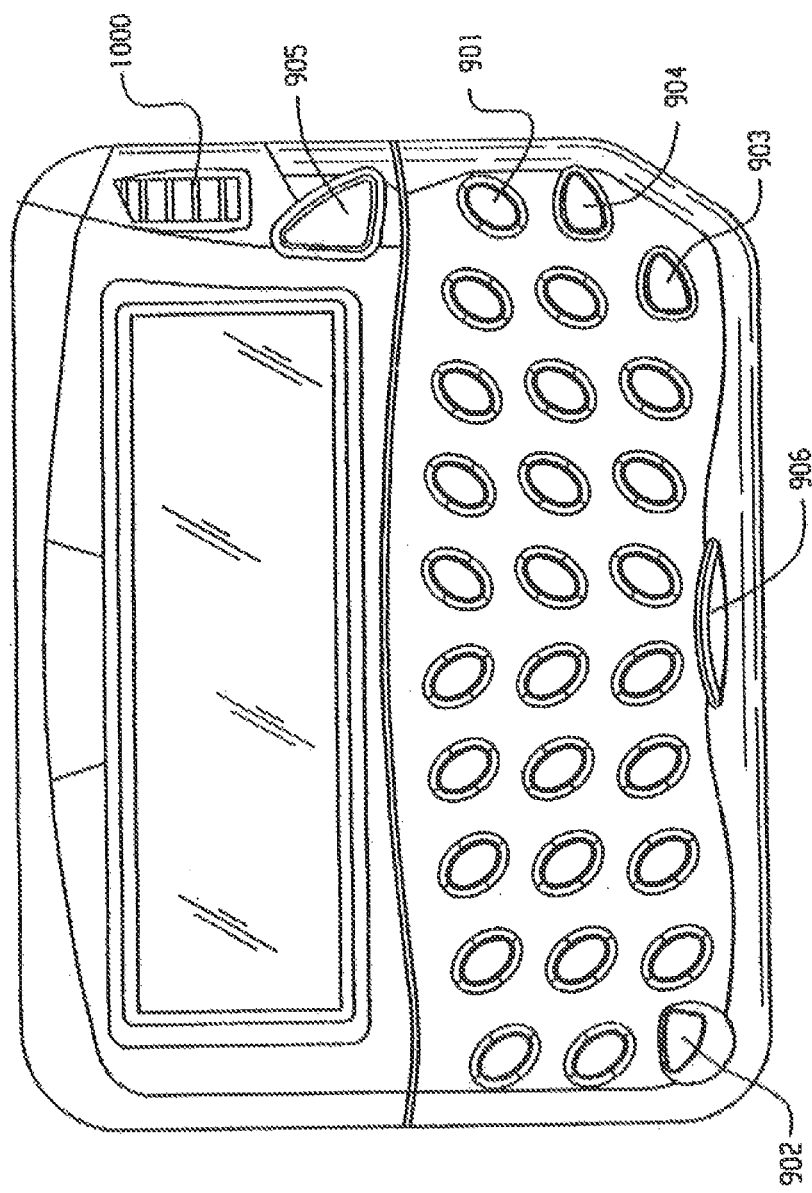
FIG. 2 is a frontal view of the hand-held device showing the shape and placement of the keys on the keyboard and the auxiliary input device.

FIG. 2 is a front view of messaging device 10 that incorporates the invention. Shown in FIG. 2 are a plurality of letter keys 901, and specialized keys 902, 903, 904 and 905 and space bar 906. Also shown is thumbwheel 1000 in its vertical orientation and in association with display 500 and keyboard

900. In the preferred embodiment, 902 is the alt key, 903 is the cap key, 904 is the line feed key and 905 is the backspace key.

Figure 3:
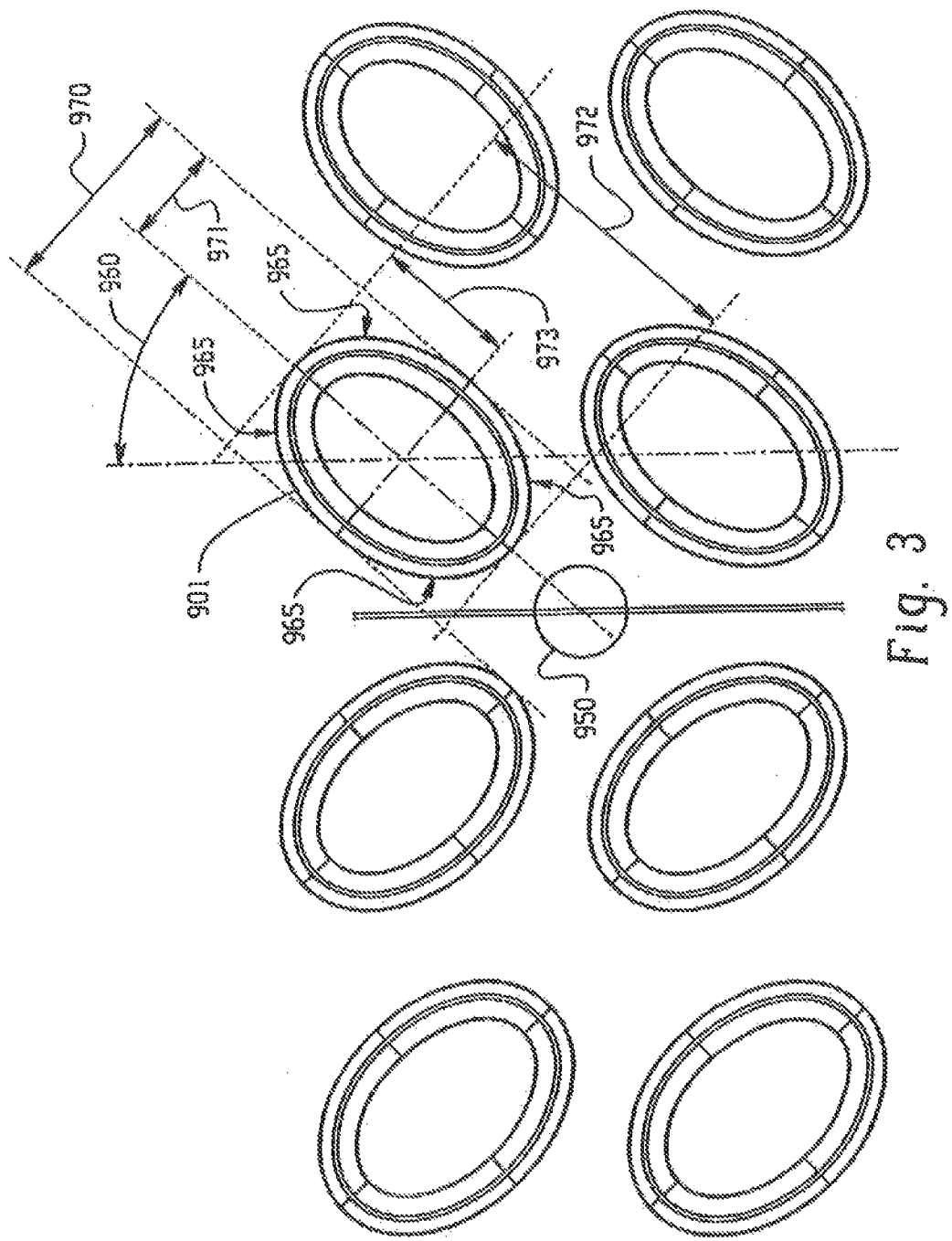
FIG. 3 is a diagram showing the shape, size and placement of the keys on the keyboard.

FIG. 3 is a view of a subset of the letter keys 901, showing dimensions and relative position of the keys. Shown also is the point 950 that marks the center of keyboard 900, key dimensions 970, 971, 972, and 973, as well as angle 960 and the rho value 965, representing curvature of a letter key 901. In investigating optimal key placement on the keyboard, it was determined that the keys should be placed at an angle 960 relative to vertical that facilitated easy typing using thumbs. That angle is preferably positive 40 degrees relative to vertical for keys on the right side of the keyboard (where 950 is center of the keyboard) and negative 40 degrees for the keys on the left side of the key board, although complementary angles ranging from 20 degrees to 70 degrees could also be used to accomplish the goal, albeit less optimally, of facilitating thumb typing. Also as shown in FIGS. 2 and 3, the keys are dispersed across keyboard 900 evenly so that there is sufficient space between the keys to decrease the opportunity for multiple keys being depressed while thumb typing. Additionally, the keys are sized appropriately given the footprint of the messaging device and the keyboard 900. In its preferred embodiment, the messaging device 10 measures across its face 64 mm by 89 mm, which does not leave much room for keyboard 900 and display 500. In the preferred embodiment, keyboard 900 occupies over half of the face of the messaging device 10.

The key shape and dimensions are also key components of the invention. In order to maximize the surface area of the key that a thumb would hit, the keys are preferably oval, and have a rho 965 defining the curvature of the key of 0.414, although values may range higher or lower. Other rho values will lead to an acceptable, but not as optimal or aesthetically pleasing shape of keys 901. As to the key dimensions, the width 970 of the key 901 is 4.8 millimeters (971 representing the radius of half that value, 2.4 mm) and the length (or height) 972 of the key 901 is 7 millimeters (973 representing the radius of half that value, 3.5 mm).

Turning to one of the software features that aids in the device 10 being optimally used for thumb typing is a capitalization feature implemented via software. If a user depresses a key 901, the operating system detects a key up event. If upon a key down event, a period of time elapses before a key up event is detected, the operating system determines that a key repeat event has occurred representing a situation where a user has continued to depress a key without releasing it. A key repeat event is then treated by application software residing in either FLASH 600 or RAM 700 as an event that requires the capitalization of the key previously depressed. This feature disables a key repeat feature and substitutes instead a capitalization feature based upon a key repeat. The timing of the key scanning to determine whether a key has been released can be set to permit a slower keyboard response or a faster keyboard response, depending upon user experience or preferences. Although the capitalization function preferably works only to change the state of a letter to a capital, it alternatively could operate to change a capital letter to a lower case letter. The actual display is changed by the application program substituting the value of the capital letter in the register that holds the value of the letter to be displayed. As alternatively implemented, the continued depressing without release of a letter key could result in a key oscillating between upper case and lower case, depending on the length of time the key is depressed.

Figure 4:
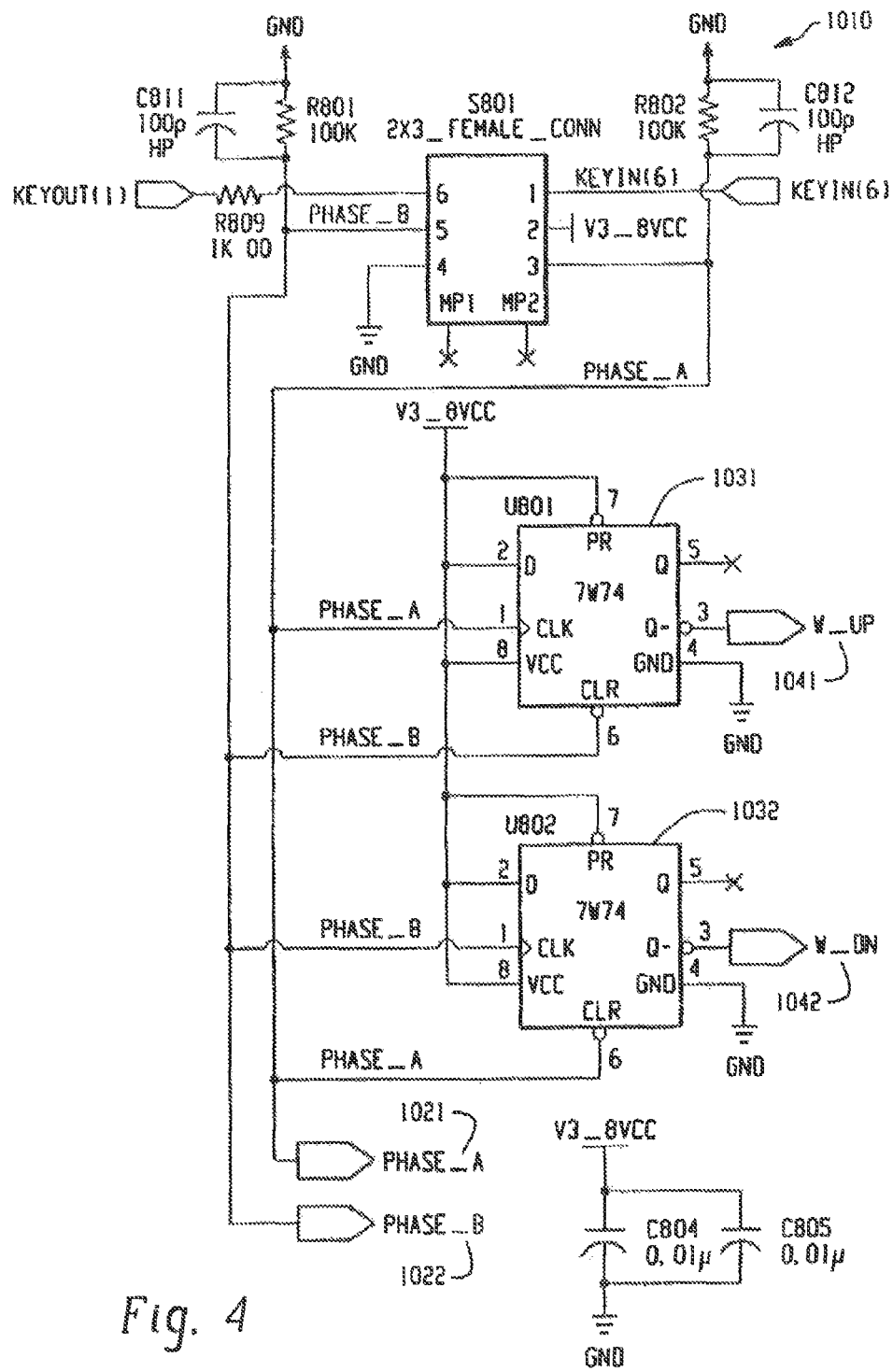
FIG. 4 is a diagram of the control circuitry for the thumbwheel.

FIG. 4 is the logic circuitry 1010 associated with thumbwheel 1000. Thumbwheel 1000 outputs quadrature signals phase A 1021 and phase B 1022, which are processed by D flip-flops 1031 and 1032 to present signals 1041 W_UP and 1042 W_DN to microprocessor 300. Signals 1041 and 1042 represent, respectively, a user rolling the thumbwheel up and rolling the thumbwheel down.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed is:

1. A handheld electronic mobile device configured for sending and receiving wireless email messages comprising:
 a keyboard comprising a plurality of letter keys;
 a display;
 a processor; and
 a memory comprising instructions executable by the processor to:
  detect a key down event, the key down event being associated with a first key being depressed;
  display a letter in a non-capitalized version associated with the first key on the display;
  determine that the key down event is maintained for a period of time greater than a first predefined threshold time period, and activate a key repeat event responsive to determination that the key down event is maintained for greater than the first predefined threshold time period, the key repeat event being enabled with a key repeat feature that duplicates on the display a letter associated with the depressed key;
  determine that the period of time during which the key down event is maintained greater than a second predefined threshold time period and responsive thereto, disable the key repeat feature, wherein the second predefined threshold time period is longer than the first predefined threshold time period;
  substitute a capitalization feature for the key repeat feature that was disabled when the key down event is maintained greater than the second predefined threshold time period, the capitalization feature being configured to cause display of a capitalized version of the displayed letter in place of the non-capitalized version thereof;
  replace the displayed letter, based on substitution of the capitalization feature for the key repeat feature, with the capitalized version of the displayed letter; and
  determine, during substitution of the capitalization feature for the key repeat featured, that the key is continuously depressed without release after the displayed letter is changed to the capitalized version for a time period greater than a third predefined threshold time period, and responsive thereto, oscillate the displayed letter back to the non-capitalized version.

2. The handheld electronic mobile device of claim 1, the instructions being further executable to:
 detect that the first key is no longer depressed; and
 responsive thereto, disable the capitalization feature.

3. The handheld electronic mobile device of claim 1, the instructions being further executable to:
 further determine that the key is continuously depressed without release after the displayed letter is oscillated back to the non-capitalized version, and responsive thereto, oscillate the displayed letter between the non-capitalized version and the capitalized version.

4. A method in a handheld electronic mobile device configured for sending and receiving wireless email messages having a keyboard comprising a plurality of letter keys and a display, the method comprising:

detecting a key down event, the key down event being associated with a first key being depressed;

displaying a letter in a non-capitalized version associated with the first key on the display;

determining that the key down event is maintained for a period of time greater than a first predefined threshold time period, and activate a key repeat event responsive to determination that the key down event is maintained for greater than the first threshold time period, the key repeat event being enabled with a key repeat feature that duplicates on the display a letter associated with the depressed key;

determining that the period of time during which the key down event is maintained is greater than a second predefined threshold time period, and responsive thereto, disable the key repeat feature, wherein the second predefined threshold time period is longer than the first predefined threshold time period;

substituting a capitalization feature for the key repeat feature that was disabled when the key down event is maintained greater than the second predefined threshold time period, the capitalization feature being configured to cause display of a capitalized version of the displayed letter in place of the non-capitalized version thereof;

replacing the displayed letter, based on substitution of the capitalization feature for the key repeat feature, with the capitalized version of the displayed letter; and determining, during substitution of the capitalization feature for the key repeat featured, that the key is continuously depressed without release after the displayed letter is changed to the capitalized version for a time period greater than a third threshold time period, and responsive thereto, oscillate the displayed letter back to the non-capitalized version.

5. The method of claim 4, further comprising:
detecting that the first key is no longer depressed; and
responsive thereto, disabling the capitalization feature.

6. The method of claim 4, further comprising:
further determining that the key is continuously depressed without release after the displayed letter is oscillated back to the non-capitalized version, and responsive thereto, oscillating the displayed letter between the non-capitalized version and the capitalized version.

7. A non-transitory computer readable storage medium containing instructions for a method performed by a handheld electronic mobile device configured for sending and receiving wireless email messages having a keyboard comprising a plurality of letter keys and a display, the method comprising:

detecting a key down event, the key down event being associated with a first key being depressed;

displaying a letter in a non-capitalized version associated with the first key on the display;

determining that the key down event is maintained for a period of time greater than a first predefined threshold time period, and activate a key repeat event responsive to determination that the key down event is maintained for greater than the first threshold time period, the key repeat event being enabled with a key repeat feature that duplicates on the display a letter associated with the depressed key;

determining that the period of time during which the key down event is maintained is greater than a second predefined threshold time period, and responsive thereto, disable the key repeat feature, wherein the second predefined threshold time period is longer than the first predefined threshold time period;

substituting a capitalization feature for the key repeat feature that was disabled when the key down event is maintained greater than the second predefined threshold time period, the capitalization feature being configured to cause display of a capitalized version of the displayed letter in place of the non-capitalized version thereof;

replacing the displayed letter, based on substitution of the capitalization feature for the key repeat feature, with the capitalized version of the displayed letter; and determining, during substitution of the capitalization feature for the key repeat featured, that the key is continuously depressed without release after the displayed letter is changed to the capitalized version for a time period greater than a third threshold time period, and responsive thereto, oscillate the displayed letter back to the non-capitalized version.

8. The non-transitory computer readable storage medium of claim 7, wherein the method further comprises:
detecting that the first key is no longer depressed; and
responsive thereto, disabling the capitalization feature.

9. The non-transitory computer readable storage medium of claim 7, wherein the method further comprises:
further determining that the key is continuously depressed without release after the displayed letter is oscillated back to the non-capitalized version, and responsive thereto, oscillating the displayed letter between the non-capitalized version and the capitalized version.

\* \* \* \* \*